G. J. OLNEY.
MEASURING AND MIXING DEVICE.
APPLICATION FILED FEB. 7, 1916.
1,226,108.
Patented May 15, 1917.
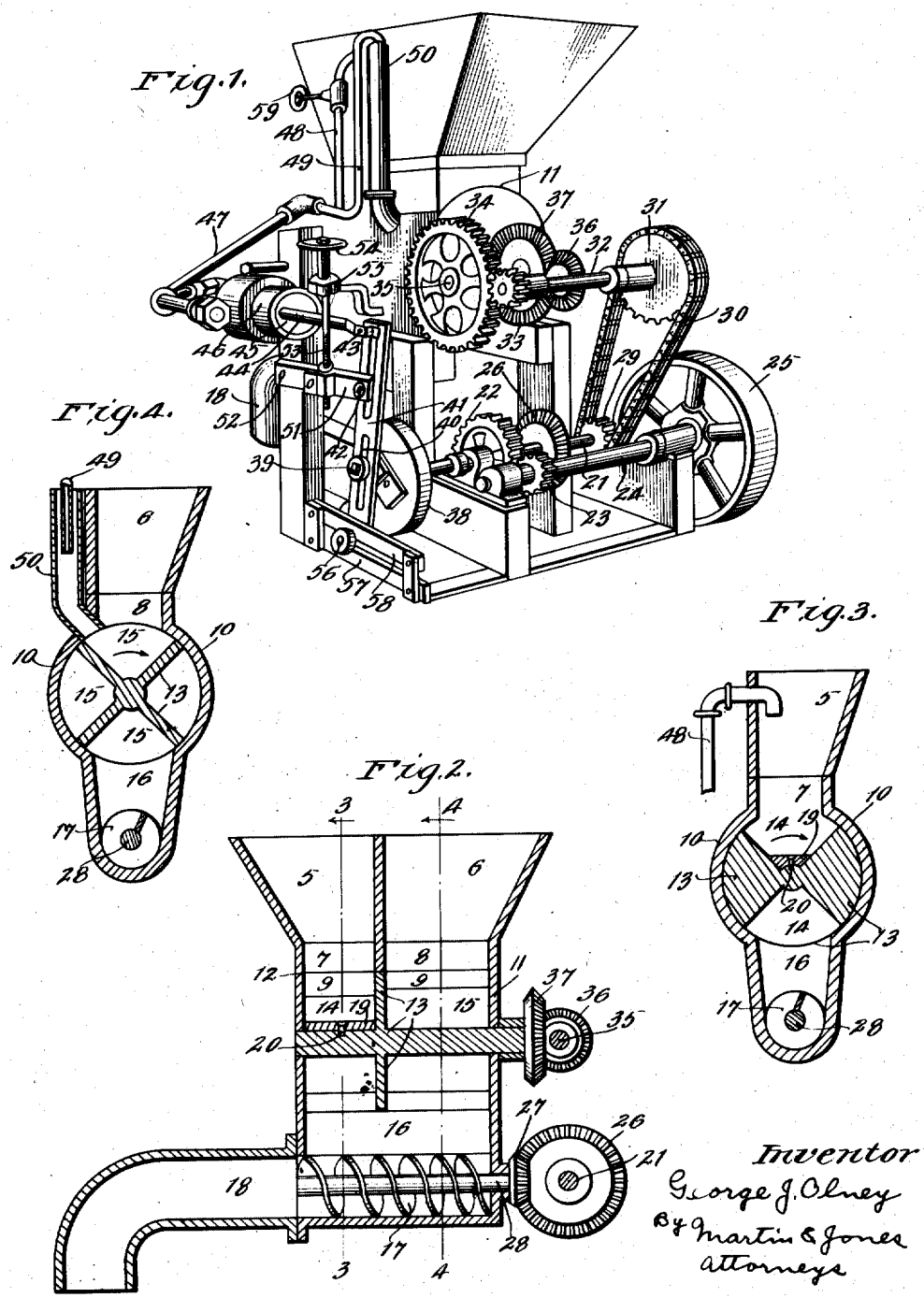

UNITED STATES PATENT OFFICE.

GEORGE J. OLNEY, OF WESTERNVILLE, NEW YORK.

MEASURING AND MIXING DEVICE.

1,226,108.   Specification of Letters Patent.   Patented May 15, 1917.

Application filed February 7, 1916. Serial No. 76,820.

*To all whom it may concern:*

Be it known that I, GEORGE J. OLNEY, of Westernville, in the county of Oneida and State of New York, have invented certain new and useful Improvements in Measuring and Mixing Devices; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to machines used for measuring or measuring and mixing a number of material in a given proportion.

While the machine is illustrated in the drawings and is described in the specification as being a machine for measuring and mixing materials in a canning factory, it will be obvious that the machine is applicable to many other classes of work and I do not mean to limit my invention solely to the canning industry.

The purpose of my invention is to provide an improved measuring and mixing machine and especially to provide a machine of improved construction and operation.

A further purpose is to provide a machine of the class described wherein a pump is provided so operatively connected to the moving measuring parts that a desired amount of liquid is supplied to the machine and mingled with the solid or semi-liquid materials being handled by the machine.

A still further purpose of my invention is to provide a measuring and mixing machine having a pump as above mentioned and having said pump so constructed and connected that the amount of liquid supplied by the pump may be varied as needed from time to time in making the mixture and furthermore to provide means for so varying the feed from said pump during the operation of the machine.

Another purpose of my invention is to provide a machine of the class described wherein means are provided for changing the relative proportion of the materials being measured and mixed.

Further purposes and advantages of my invention will appear from the specification and claims herein.

Figure 1 is a perspective view of a measuring and mixing machine embodying my invention.

Fig. 2 is a vertical longitudinal section through the hoppers, measuring chamber and mixing chamber of said machine.

Fig. 3 is a sectional view on line 3—3 of Fig. 2.

Fig. 4 is a sectional view on line 4—4 of Fig. 2.

Referring to the drawings in a more particular description, there is shown two hoppers 5 and 6 preferably arranged side by side with outlets 7 and 8 respectively at their lower ends. Said outlets open into a measuring chamber 9 which is cylindrical in shape and horizontally arranged, being composed of a casing having curved sides 10 and end walls 11 and 12.

Revolubly mounted in the measuring chamber 9 is the measuring member 13 provided with two series of pockets 14 and 15 arranged below and respectively equaling in length the outlets 7 and 8 of the hoppers 5 and 6. The arrangement of said measuring member is such that as the different pockets of each series are brought beneath the outlet into that series, said pockets will be filled with the material from the hopper thereabove and as the measuring member continues its rotation the material thus received and measured by the measuring member 13 in both of its series of pockets will be carried around in the cylindrical measuring chamber 9 until the pockets face downward whereupon the weight of the materials being handled will cause the material to drop from the pockets into the common mixing chamber 16 where a worm 17 further mixes the materials and forces it out from the mixing chamber 16 to the left as shown in Fig. 2 through the outlet pipe 18.

The machine illustrated herein is particularly adapted for use in measuring and mixing materials used in canning succotash. When making succotash usually a much larger proportion of corn is used than of beans. The measuring of the larger amount of corn is provided for in the machine herein illustrated in two ways. First by having the pockets 15 which are to receive said corn longer than the pockets 14 and secondly by having the pockets 14 less in number than the pockets 15. As shown particularly in Fig. 3 that portion of the measuring member 13 that has the pockets 14 has only two pockets each shown as being substantially a quarter of a circle transversely while the rest of the circle of that end of the measuring member is left blank or without recesses or in other words comes out to the periphery of the measuring member. It will be obvious that while the non-recessed portion of the measuring member is passing beneath the outlet 7 no material will be passed down into the measuring chamber although the measuring member is still rotating and at its other end is receiving and measuring corn.

The pockets 15 upon the corn measuring portion of the member 13 are shown as being substantially quarter sections of a circle but it will be obvious that other forms of pockets may be used and that the number of them about the periphery of the member 13 may be increased if desired. In order to maintain a positive measure it is inadvisable to have any one pocket extend more than a quarter of the way above the periphery of the measuring member.

The relative capacity of the two series of pockets 14 and 15 may be further modified by inserting filling members in one or more of the pockets of a given series such for instance as the filler 19 fastened by a screw 20 into the bottom of the upper pocket 14 in Figs. 2 and 3. It will be obvious that such a filler will to the extent of its cubical contents reduce the amount which that pocket will receive and carry around to emptying position.

The different parts of the machine are driven at a fixed ratio of speed by means of all the parts receiving their power from a single driven shaft 21 suitably journaled upon the frame work of the machine. As shown this shaft 21 is driven at a relatively slow speed through gear wheel 22 being driven by a smaller gear 23 upon a parallel shaft 24 which is driven by large pulley 25. Upon the shaft 21 is secured a bevel gear 26 in mesh with another bevel gear 27 mounted upon the outside end of the shaft 28 which carries the worm 17 in the mixing chamber 16. A relatively small sprocket wheel 29 on shaft 21 through chain 30 and sprocket wheel 31 drives the jack shaft 32 mounted farther up upon the machine. On this jack shaft 32 is a small pinion 33 in mesh with the gear wheel 34 upon shaft 35. On this shaft 35 is a bevel gear 36 of relatively small size in mesh with a larger bevel gear 37 on the end of the measuring member 13 which projects through the end wall 11 of the measuring chamber.

At one end of shaft 21 there is mounted a wheel 38 upon which eccentrically mounted is a crank pin 39 slidingly mounted in slot 40 of lever 41 which is fulcrumed upon a pin 42. The other end of said lever has pivotally mounted at 43 the piston rod 44 of piston 45 of pump 46. This pump is adapted to pump brine or other liquid used in canning or any other measuring and mixing process that is being carried on. From the pump shown in the drawings there extends a pipe 47 branching later into branches 48 and 49. The branch 48 conducts the liquid into the hopper 5 while the branch 49 conducts the liquid into that portion of the mixing chamber through which travel the pockets 15 as shown in Fig. 4. In order to introduce the liquid from branch 49 into the measuring chamber without interfering with the measuring and without choking the passage for said liquid and particularly in order to provide for the necessary escape of air I carry the said branch 49 up to about the level of the top of the hopper 6 and then have said branch extend down a short distance within a pipe 50 having a larger internal diameter than the external diameter of pipe 49. In this way the liquid from pipe 49 passes down through pipe 50 which extends through the side wall of the measuring chamber and so delivers the liquid into the pockets 15. As the measuring member rotates and as its pockets 15 are filled with the descending corn or other materials air caught in said pockets may ascend through pipe 50 without interfering with the supply of liquid and without forcing the liquid back through pipe 49.

As it is often desirable to change the proportion of liquid according to the different materials being handled or the different mixtures being made, I have provided means for readily changing the amount of liquid handled by the pump while the machine as a whole is being driven at a given speed. This adjusting means consists in the way in which the piston rod 44 is connected to crank arm 39 by lever 41. The fulcrum point 42 for said lever is movable through said fulcrum point being a pin at the free end of a lever 51 pivotally secured to the frame of the machine at its other end 52. Intermediate its ends said lever 51 is operatively connected to an adjusting screw 53 controlled by hand wheel 54 mounted in a bracket 55 conveniently projected from the frame of the machine. It will be obvious that manipulation of the hand wheel 54 will cause the fulcrum point 42 to move up or down and thus increase or decrease the amount of travel of the pump piston 45 at its stroke and thus directly control the amount of liquid handled by the pump. It will be further noted that this control over the pump is had without interfering with the operation or adjustment of the rest of the machine and furthermore that this adjustment of the amount of liquid supplied may be had as readily when the machine is in operation as when stopped.

The lower end of lever 41 has an outwardly projecting finger 56 thereon sliding between fixed guideways 57 and 58 provided upon the machine in order to prevent undue longitudinal motion of the lever 41.

Branch pipe 48 conveying the brine or other liquid for the beans which pass down through hopper 5 and the pockets 14 is preferably connected directly into the said hopper 5. The reason for this is that the beans being handled are substantially dry or without juice of their own when brought into said hopper and have some tendency to clog. As the brine has to be mingled with the mixture later on I utilize it as it were for a lubricant to make the beans slip down readily through the hopper 5 into the pockets 14 as said pockets are presented by the rotation of the measuring member. A valve 59 conveniently located upon the external part of pipe 48 affords means for controlling the amount of liquid passing into hopper 5 or if needed entirely cutting off the supply thereto. On account of the arrangement of the pipes and the more devious course that the liquid passing through pipe 49 has to take and particularly the fact that the liquid from pipe 49 is introduced down in the measuring chamber, the liquid tends to flow more freely through pipe 48 so that the valve 56 upon pipe 48 gets all the control that is necessary.

It will be noted by reference to Fig. 4 that the pipe 50 conducting the liquid from pipe 49 opens into the measuring chamber on the side from which the next succeeding pocket is to come. In other words the pockets 15 receive some of this liquid before the pocket is open to the outlet 8 from hopper 6. In this way some of the liquid is admitted into each pocket 15 before any corn is received by said pocket with the result that the sides of said pocket are cleaned or washed off by the brine and are made wet so that the corn will not tend to cling to the surfaces of the pocket.

What I claim as new and desire to secure by Letters Patent is:

1. In a measuring and mixing machine the combination of two separate hoppers, a hollow cylindrical casing therebelow with openings opposite the hoppers, a cylinder mounted therein closing the outlet from said hoppers and having two series of pockets, one series under each hopper and adapted to be filled therefrom, said cylinder being revolubly mounted whereby its pockets are filled when in upward position and may empty themselves when in downward position and will return to receiving position as the cylinder revolves, a pipe for conducting liquid directly into the cylinder for one series of pockets at a point before the said pockets reach the outlet from their hopper and an air outlet from the cylindrical casing opposite said pockets adapted to let the air escape from the pockets being filled without passing upward through the hopper.

2. In a measuring and mixing machine the combination of two separate hoppers, a hollow cylindrical casing therebelow with openings opposite the hoppers, a cylinder mounted therein closing the outlet from said hoppers and having two series of pockets, one series under each hopper and adapted to be filled therefrom, said cylinder being revolubly mounted whereby its pockets are filled when in upward position and may empty themselves when in downward position and will return to receiving position as the cylinder revolves, a pipe for conducting liquid to the hopper feeding one series of pockets and a pipe for conducting liquid directly into the cylinder for the other series of pockets at a point before the said pockets reach the outlet from their hopper and an air outlet for the cylindrical casing opposite said second pockets adapted to let the air escape from the pocket being filled without passing upward through the hopper.

In witness whereof I have affixed my signature this 20th day of January, 1916.

GEORGE J. OLNEY.